Sept. 15, 1953     L. H. PHILLIPS     2,652,293
SELF-ALIGNING BEARING
Filed July 8, 1950
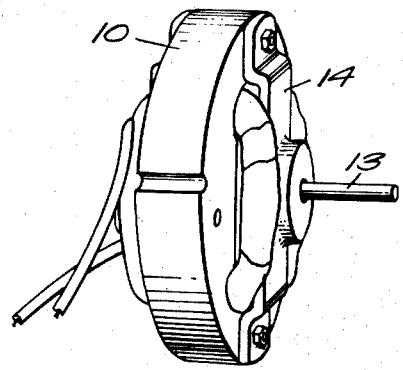
FIG. 1
FIG. 2
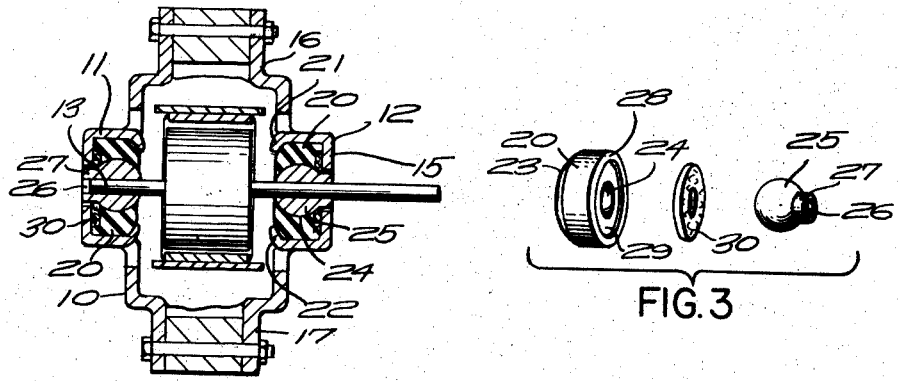
FIG. 3
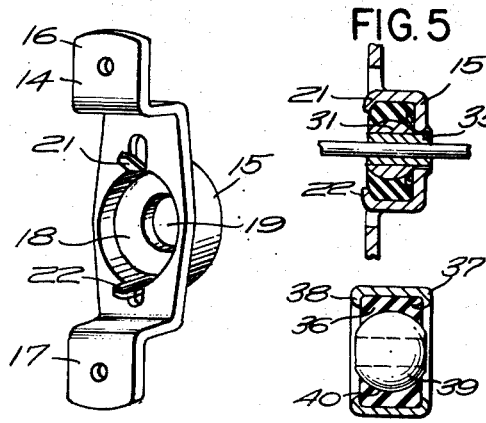
FIG. 4
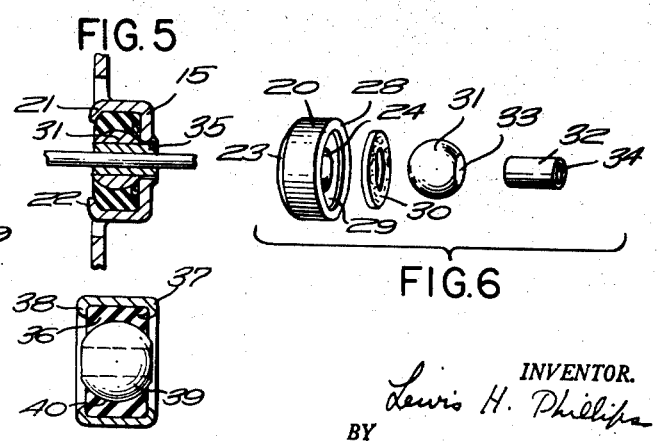
FIG. 5
FIG. 6
FIG. 7
INVENTOR.
Lewis H. Phillips
BY
Nathaniel Frucht
ATTORNEY Patented Sept. 15, 1953

2,652,293

UNITED STATES PATENT OFFICE 2,652,293

SELF-ALIGNING BEARING

Lewis H. Phillips, Marblehead, Mass., assignor to Self-Aligning Bearing Company, Inc., a corporation of Rhode Island Application July 8, 1950, Serial No. 172,699

5 Claims. (Cl. 308—72)

The present invention relates to bearing mountings for industrial use, and specifically to bearing mountings for small electric motors.

The principal object of the invention is to provide a bearing for a small motor assembly which is self-aligning.

Another object of the invention is to provide a simple bearing construction which has a small number of parts and is readily manufactured and assembled.

A further object of the invention is to provide a bearing mounting utilizing a rubber seat, whereby vibration and noise is eliminated, and heating is reduced.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a perspective view of a small motor equipped with the bearing mountings embodying the invention;

Fig. 2 is an enlarged vertical section therethrough;

Fig. 3 is an exploded view of the mounting parts;

Fig. 4 is a perspective view of the bearing bracket;

Fig. 5 is a sectional detail disclosing a modified construction;

Fig. 6 is an exploded view of the parts therefor;

Fig. 7 is a sectional detail showing a modified bearing assembly.

It has been found desirable to provide a simple and inexpensive self-aligning bearing mounting for a small electric motor, which can be readily manufactured and assembled, and which compensates for shaft misalignments due to construction irregularities. To this end, I have devised a bearing bracket which has a seat to receive a bearing disk in which a spherical bearing is mounted so that it automatically adjusts itself to shaft angularities.

I have found it desirable to use rubber for the bearing disk, as it resiliently locks the spherical bearing in place and compensates for minor variations in bearing dimensions. It is also very quiet in operation, is highly resistant to oil, and does not deteriorate at high temperature, and instead initially slightly softens to become set in aligned position when running, the set becoming permanent under continued use and the accompanying temperature drops and increases. The preferred rubbers are polycrylin ester and butadrene acrylonite, although neoprene, latex compound and silicone rubber have also been found satisfactory. The polycrylin ester, for example, does not unduly swell in lubricating oil, and can readily withstand a service temperature of from 250° to 350° F.

Referring to the drawings, the small electric motor 10 has two bearing mountings 11, 12 for its motor shaft 13. Each bearing mounting includes a bracket 14, see Fig. 4, which may be of cast metal but preferably is stamped out of sheet metal, having a center portion 15, and shaped ends 16, 17 adapted to be secured to a motor frame, the center portion being provided with an annular well 18 having a central opening 19.

A bearing disk 20, see Fig. 3, made of a suitable non-metallic material such as synthetic rubber or the like, is seated in the well 18 and locked in place, as by tabs 21, 22 bent out of the stock of the bracket 14. The disk 20 has one side crowned, as indicated at 23, to give clearance to the rotating parts and to reduce overall motor dimensions, and has a central opening 24 of convexly arcuate form, to provide a spherical seat for a spherical bearing 25 which is made of suitable bearing metal and is of a size to snap into the seat and be firmly retained therein.

The spherical bearing 25 has a central shaft receiving bore 26, and an annular collar 27 on one end positioned around the bore 26, the collar extending into the well opening 19 as illustrated. The disk 20 has its outer face 28 recessed as indicated at 29 to provide a seat for a felt washer 30 or the like, the inner end of the belt washer being held away from the motor shaft by the bearing collar 27.

The above bearing mounting construction uses a small number of readily manufactured and assembled parts, and is self-aligning, whereby the cost of assembly is low, the assembly itself is aligned and therefore not noisy, the cost of replacement in case of repair is not high, and slight variations in the sizes of the parts are automatically compensated for.

If desired, the parts may be adapted for use with needle motor shafts, by forming the spherical bearing as indicated by the reference numeral 31 in Fig. 6, whereby a sleeve 32 may be inset in the bearing bore 33, the sleeve having a shaft receiving bore 34. The length of the sleeve is preferably sufficient to extend outwardly from the bearing to provide a projecting collar 35 for ensuring separation of the felt washer from the rotating shaft.

A separate bearing assembly may also be provided for mounting in the bearing brackets, or for use in pillow blocks, shaft hangers, and the like. One embodiment of this construction is shown in Fig. 7, the flexible disk 36 being mounted in a cylindrical bearing shell 37, and secured therein by any suitable means, as by soft vulcanizing within the shell, or by spinning the shell ends over as indicated at 38. The spherical bearing 39 is then snap seated within the spherical seat 40 of the flexible disk 36.

Although I have described the invention as applied to small motor shafts, the invention may be adapted for other industrial use, such as line shafting where shock loads tend to destroy fixed bearings, pillow blocks for jack shaft use where power transmission is relatively light, misalignment is a factor, and noise is objectionable, and as a substitute for domestic and industrial appliances which use a self-aligning bearing of the sleeve type. Also, the invention may be readily adapted to provide a convenient tiltable or swivel base for ornamental and novelty uses, such as for flag mountings, fans, dryers, lamp bases, and the like. The adaptation of the invention to such uses provides an adjustable mounting which will stay in any set position without secondary tightening or adjustment.

Although I have described specific constructions of bearing mountings embodying the invention, it is obvious that changes may be made in the size, shape, material and arrangement of the parts to meet the requirements for different uses, without departing from the spirit and the scope of the invention as defined in the appended claims.

I claim:

1. In a bearing mounting, a bracket having two ends for securing to a motor frame and a center portion, said center portion having a well with a central opening, a disk of flexible material having a spherical seat, one end of said disk having a crown with a central opening, said crown extending over the rear portion of the spherical seat, the other end of the disk having a cylindrical recess on its inner surface extending over the front portion of the spherical seat, means securing said disk in said well with its central opening in axial alignment with the well central opening, a felt washer seated in said cylindrical recess, and a spherical bearing movably mounted in said seat between the felt washer and the disk crown.

2. In a bearing mounting, a bracket having two ends for securing to a motor frame and a center portion, said center portion having a well with a central opening, a disk of flexible material having a spherical seat, one end of said disk having a crown with a central opening, said crown extending over the rear portion of the spherical seat, the other end of the disk having a cylindrical recess on its inner surface extending over the front portion of the spherical seat, means securing said disk in said well with its central opening in axial alignment with the well central opening, a felt washer seated in said cylindrical recess, and a spherical bearing movably mounted in said seat between the felt washer and the disk crown, said spherical bearing having a bore and a shaft receiving collar in said bore.

3. In a bearing mounting, a bracket having two ends for securing to a motor frame and a center portion, said center portion having a well with a central opening, a disk of flexible material having a spherical seat, one end of said disk having a crown with a central opening, said crown extending over the rear portion of the spherical seat, the other end of the disk having a cylindrical recess on its inner surface extending over the front portion of the spherical seat, means securing said disk in said well with its central opening in axial alignment with the well central opening, said means comprising lugs struck up from the bracket, a felt washer seated in said cylindrical recess, and a spherical bearing movably mounted in said seat between the felt washer and the disk crown.

4. In a bearing mounting, a bracket having two ends for securing to a motor frame and a center portion, said center portion having a well with a central opening, a disk of flexible material having a spherical seat, one end of said disk having a crown with a central opening, said crown extending over the rear portion of the spherical seat, the other end of the disk having a cylindrical recess on its inner surface extending over the front portion of the spherical seat, means securing said disk in said well with its central opening in axial alignment with the well central opening, said means comprising lugs struck up from the bracket, a felt washer seated in said cylindrical recess, and a spherical bearing movably mounted in said seat between the felt washer and the disk crown, said spherical bearing having a bore and a shaft receiving collar in said bore.

5. In combination, a motor frame, bracket elements secured to opposite sides of said frame, a motor in said frame between said bracket elements and having a shaft, each bracket element having a center portion, said center portion having a well with a central opening, a disk of flexible material having a spherical seat, one end of said disk having a crown with a central opening, said crown extending over the rear portion of the spherical seat, the other end of the disk having a cylindrical recess on its inner surface extending over the front portion of the spherical seat, means securing said disk in said well with its central opening in axial alignment with the well central opening, a felt washer seated in said cylindrical recess, and a spherical bearing movably mounted in each said seat between the felt washer and the disk crown, said bearings having aligned bores for rotatably receiving the motor shaft.

LEWIS H. PHILLIPS.

References Cited in the file of this patent
UNITED STATES PATENTS

| Number | Name | Date |
|---|---|---|
| 1,881,601 | Hufferd | Oct. 11, 1932 |
| 1,989,116 | Strauss | Jan. 29, 1935 |
| 2,187,037 | Kirkpatrick | Jan. 16, 1940 |
| 2,223,872 | McWhorter | Dec. 3, 1940 |
| 2,304,595 | Prentice | Dec. 8, 1942 |
| 2,460,063 | Cole | Jan. 25, 1949 |